United States Patent

[11] 3,601,574

[72] Inventor Theodore E. Fiddler
 1268 Suffield Drive, Birmingham, Mich. 48009
[21] Appl. No. 21,057
[22] Filed Mar. 19, 1970
[45] Patented Aug. 24, 1971

[54] PART STRUCTURE FOR PROJECTION WELDING A NONMETALLIC BODY TO A METAL PART
3 Claims, 12 Drawing Figs.
[52] U.S. Cl. ..................................................... 219/93, 219/99
[51] Int. Cl. ....................................................... B23k 11/14
[50] Field of Search........................................... 219/93, 96–99, 106; 161/120, 121, 124, 40; 12/430

[56] References Cited
UNITED STATES PATENTS
2,201,067  5/1940  Whitmer ...................... 219/93
3,426,394  2/1969  Puopitch ...................... 219/99 X
3,471,355  10/1969  Truesdell et al. ............. 161/40

Primary Examiner—J. V. Truhe
Assistant Examiner—J. G. Smith
Attorney—William T. Sevald ABSTRACT: A part structure for projection resistance welding a nonmetallic or electrically non-conductive body, such as of synthetic resin, wood, porcelain, ceramic, etc. to a metal base wherein the part structure comprises the nonconductive body, a conductive welding projection of the body, and a current conducting member carried by the body leading to the projection from a remote surface on the body; the part structure being weldable on a metal base by including the metal base and a welding machine electrode, such as press-platen, in a welding circuit and disposing the part structure between the metal base and the platen with welding current communicating from the platen to the base through the current conducting member and the projection to fuse the projection with the base.

PATENTED AUG 24 1971 3,601,574
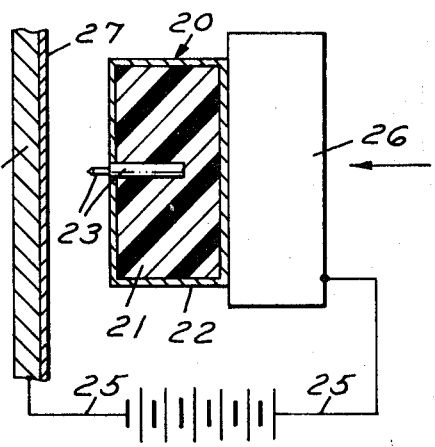
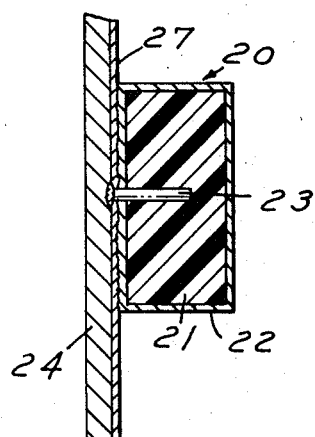
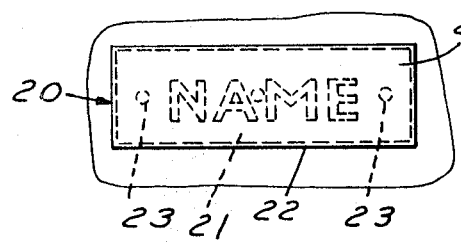
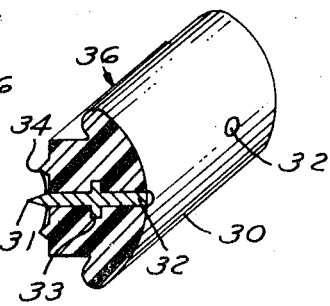
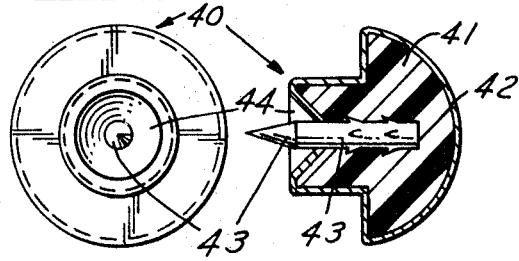
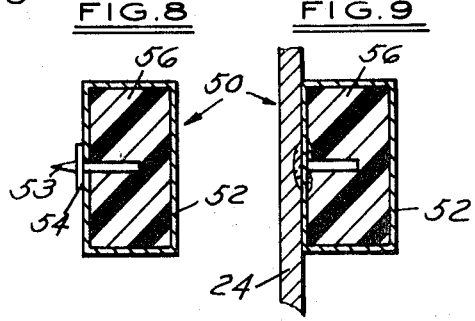
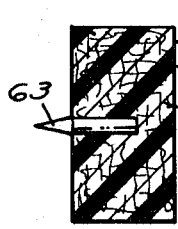
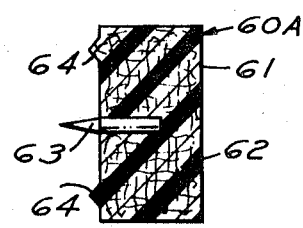
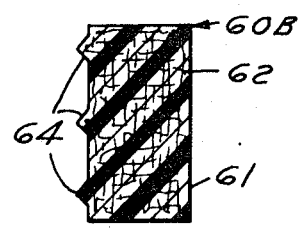
INVENTOR
THEODORE E. FIDDLER
BY
ATTORNEY

PART STRUCTURE FOR PROJECTION WELDING A NONMETALLIC BODY TO A METAL PART

This invention relates to a novel part structure for projection welding a nonmetallic body to a metal part.

Various auxiliary parts which are mounted on the metal base portions of boats, airplanes, automobiles, appliances, etc., are made of material such as synthetic resin, wood, ceramic, porcelain, etc., which does not conduct a welding current so that the parts cannot be welded to the metal base portion. Thus special fasteners must be employed to mount the nonmetallic parts on the metal base portions and this usually requires apertures in the base portions or studs welded to the base portions all of which are time, material, and operationally consuming and therefore expensive.

It is therefore a primary object of the invention to provide a novel part structure for resistance projecting welding an electrically nonconducting part to an electrically conducting base which is simple in design and construction, inexpensive to manufacture and mount, which does not require preformed apertures or studs on the base, and which does not require special fasteners.

An object of the invention is to provide a resistance or projection welding part structure for attaching a nonconductive part to a conductive base including a conductive welding projection on the body surface and a current-conducting member carried by the body leading to the projection from a remote surface on the body to conduct current past the nonconductive body.

An object of the invention is to provide the current-conducting member on the body leading to the welding projection to provide a lead around the body so that the press-platen or other electrode engaging the part can supply current to the projection at the metal base.

An object of the invention is to provide various types or forms of current-conducting members such as a plated metal layer, impregnated metal strands, extensions on a welding stud, etc., in conjunction with the body and projection.

An object of the invention is to provide various types or forms of weld projections such as metal studs, metal plated projections, metal strand impregnated projections, etc., in conjunction with the body and the current-conducting member.

These and other objects of the invention will become apparent by reference to the following description of exemplary part structures embodying the invention taken in connection with the accompanying drawing in which:

FIG. 1 is a face elevational view of a part having a nonconductive body, a conductive layer on the body, and a metal stud in the body with the layer and stud shown in broken lines.

FIG. 2 is a diagrammatic view of a metal base and press-platen in a welding circuit showing the base as coated and in cross section and showing the part of FIG. 1 in cross section there between with the metal stud shown in elevation.

FIG. 3 is a view similar to FIG. 2, with the platen deleted after the welding operation showing the metal stud penetrating the coating on the base and fused to the metal base and with the coating on the base and the layer on the body adhered together by the heat of welding.

FIG. 4 is a perspective and cross-sectional view of a part structure having a metal welding projection and a conductive member as an extension through the nonconductive body to the outer side thereof for platen contact, and showing an annular bead around the projection.

FIG. 5 is a face elevational view of the part of FIG. 4 as seen from the left side thereof.

FIG. 6 is a cross-sectional view of the part seen in FIG. 7, showing a metal stud staked in the nonconductive body, a conductive member as a layer, and an annular bead and layer formed by a conical indentation around the stud.

FIG. 7 is an end elevational view of the part of FIG. 6 as seen from the left side thereof.

FIG. 8 is a cross-sectional view of a part similar to the part of FIGS. 1–3, showing a flange on the metal stud overlying the conductive member layer.

FIG. 9 is a cross-sectional view of the part of FIG. 8 after it is welded to a base which is also shown in cross section.

FIG. 10 is a cross-sectional view of a part showing a metal stud and a conductive member constituted by impregnated metal strands or particles in the nonconductive body body.

FIG. 11 is a view similar to FIG. 10 additionally showing welding projections of metal strand impregnated material; and FIG. 12 is a view similar to FIG. 11 showing a nonconductive body, conductive members impregnated in the body, and welding projections of body material impregnated with metal conducting members.

Referring now to the drawing wherein like numerals refer to like and corresponding parts throughout the several views, the novel part structure disclosed therein to illustrate the invention comprises, a resistance welding part 20, FIGS. 1, 2 and 3, including an electrically nonconductive body 21, a conductive member 22 as a layer on the body 21, and a conductive welding projection 23 connecting with the member 22.

The part 20, such as a name plate, is welded on a metal base 24 by fusing the projection 23 therewith. The base 24 and a press-platen 25 are connected in a welding circuit 26. The press-platen 25 electrically connects with the member 22 leading to the projection 23 thus placing the projection in the welding circuit 26 opposite the base 24. With activation of the welding cycle and advancing movement of the platen 25, the projection 23 is moved into forced contact with the base 24 and is fused therewith mounting the part 20 on the base 24. The base 24 may have a protective or decorative coating 27 such as rustproofing, paint and/or lacquer. The projection 23 is equipped with a pointed end which penetrates the coating 27 and makes contact with the metal base 24. With the heat of welding the coating 27 and conductive member 22 also become heated, and with the coating 27 being thermoplastic, the member 22 and coating 27 adhere together adding to the attachment between the part 20 and the base 24 as shown in FIG. 3.

The embodiment of FIGS. 4 and 5 comprises part 36 having a body 30, such as a molding clip, having a welding protection 31 such as a metal stud. The conductive member 32 leads through the body 30 from the projection 31 to the outer face of the body 30. A collar flange 33 surrounds the stem of the member 32 for mechanical connection with the body 30. An annular bead 34 surrounds the projection 31 and constitutes a container ring abutting the base 24 when the projection 31 is welded thereon for containing any material melted off any component during welding. The bead 34 diminishes in mass or cross-sectional area as it extends from the body to provide an easily softened face which sealably forms against the base sealing around the weld reducing exposure of the weld to corroding elements such as salt, etc.

FIGS. 6 and 7 show a part 40, such as a cap, having a body 41, a conductive member 42, and a projection 43. The projection 43 is a metal stud 43 staked in the body 41. The body has a concave nose 44 creating a cavity around the projection 43 and an outer ring. The member 42 is a layer on the body 41 and leads from the outer face of the part 40 to the projection 43. When the part 40 is welded to a base 24, the heat of welding at the projection 43 and in the portion of the member 42 over the concave nose 44 are also heated and in conjunction with a thermoplastic coating 27 on the base, also heat, soften and adhere to the coating 27. Also, if the base if not coated, the ring of the concave nose 44 welds to the base.

FIGS. 8 and 9 show a part 50 having a body 51, a conductive member surface layer 52, and a metal stud weld projection 53 equipped with a radial flange 54 overlying the member 52. The flange 54 increases area of contact between the projection 53 and the member 52. When the part 50 is welded to the base 24, the heat of welding is communicated by the projection stud 53 and flange 54 to the body 51. Under the welding forces the flange 54 and stud 53 move into the body and the projection 53 and flange 54 fuse on the base 24, FIG. 9.

FIGS. 10, 11 and 12 show parts 60, 60A, and 60B having a body 61, a conductive member 62 impregnated in the body 61 in the form of metal stands and/or particles, and welding projections in the form of a metal stud 63, FIGS. 10, and 11, and in the form of metal-impregnated body material points 64, FIGS. 11 and 12. The metal stud 63 is in contact with the conductive member 62 impregnated in the body. The conductive member 62 leads from the stud 63 to the outer surface of the parts 60 and 60A so that welding current between the platen 26 and the base 24 is conducted by the member 62 from the outer surface of the part to the stud 63 and through the stud to the base 24. The points 64 make welding contact with the base 24 through the member 62 and the member 62 conducts current from the points 63 to the outer surface of the part 60A and 60B for contact with the platen 26.

The scope of the invention is defined by the appended claims.

I claim:

1. A resistance welding part structure comprising;
  an electrically nonconductive body having an adjacent surface for fixedly abutting a base and a remote surface for removably abutting a welding machine part such as a press-platen,
  a current-conducting welding projection on said body extending from said adjacent surface for welding contact with a base, and
  a current-conducting member carried by said body leading from said remote surface to said projection on said adjacent surface;
  said structure when positioned between a metal base and a press-platen, which are connected in a welding circuit, being weldable on the base by transferring current between the press-platen and the base to said projection at the base via said conducting member to conduct current past said nonconductive body to said projection and to fuse said projection to the base in conjunction with the welding cycle of the welding circuit and the advancing movement of the press-platen, said current-conducting member being an electrically conductive coating layer on said body.

2. In a device as set forth in claim 1, a bead on said adjacent surface of said body at least partially around said projection; said bead acting as a containing wall for material melting from the heat of welding.

3. In a device as set forth in claim 1, a ring-bead at least partially around said projection of at least a surface layer of electrical conducting material constituting a welding stud for welding against the metal base.